(12) United States Patent
Chen

(10) Patent No.: US 11,815,273 B2
(45) Date of Patent: Nov. 14, 2023

(54) HVAC DOOR AND LINKAGE ASSEMBLY FOR DOORS ROTATING ALONG NON-PARALLEL AXES

(71) Applicant: DENSO International America, Inc., Southfield, MI (US)

(72) Inventor: Siyue Chen, Northville, MI (US)

(73) Assignee: DENSO International America, Inc., Southfield, MI (US)

( * ) Notice: Subject to any disclaimer, the term of this patent is extended or adjusted under 35 U.S.C. 154(b) by 913 days.

(21) Appl. No.: 16/820,162

(22) Filed: Mar. 16, 2020

(65) Prior Publication Data

US 2020/0300481 A1 Sep. 24, 2020

Related U.S. Application Data

(60) Provisional application No. 62/822,316, filed on Mar. 22, 2019.

(51) Int. Cl.
| | |
|---|---|
| *F24F 1/028* | (2019.01) |
| *F24F 13/14* | (2006.01) |
| *F24F 13/20* | (2006.01) |
| *B60H 1/00* | (2006.01) |
| *F24F 13/08* | (2006.01) |

(52) U.S. Cl.
CPC ............ *F24F 1/028* (2019.02); *F24F 13/142* (2013.01); *F24F 13/1426* (2013.01); *B60H 1/00664* (2013.01); *B60H 1/00671* (2013.01); *B60H 1/00835* (2013.01); *B60H 1/00842* (2013.01); *B60H 1/00864* (2013.01); *F24F 13/08* (2013.01); *F24F 2013/1433* (2013.01); *F24F 2013/1473* (2013.01); *F24F 2013/207* (2013.01)

(58) Field of Classification Search
CPC ...... F24F 1/028; F24F 13/142; F24F 13/1426; F24F 13/08; F24F 2013/1433; F24F 2013/1473; F24F 2013/207; F24F 13/20; B60H 1/00664; B60H 1/00671; B60H 1/00835; B60H 1/00842; B60H 1/00864; F16H 53/08; F16H 21/28; F16H 19/04; F16H 55/26
See application file for complete search history.

(56) References Cited

FOREIGN PATENT DOCUMENTS

| CN | 106705542 A | * | 5/2017 | .............. F25D 11/00 |
| EP | 1132228 A1 | * | 9/2001 | ......... B60H 1/00842 |
| WO | WO-02098689 A1 | * | 12/2002 | ......... B60H 1/00842 |

* cited by examiner

*Primary Examiner* — Edelmira Bosques
*Assistant Examiner* — Michael James Giordano
(74) *Attorney, Agent, or Firm* — Harness, Dickey & Pierce, P.L.C.

(57) ABSTRACT

A heating, ventilation, and air conditioning (HVAC) door assembly includes a first HVAC door rotating about a first axis, a second HVAC door rotating about a second axis that is nonparallel with the first axis, an actuator, a mode cam. The mode cam is engaged with the actuator and controls movement of the first HVAC door and the second HVAC door.

10 Claims, 6 Drawing Sheets

HVAC DOOR AND LINKAGE ASSEMBLY FOR DOORS ROTATING ALONG NON-PARALLEL AXES

CROSS-REFERENCE TO RELATED APPLICATIONS

This application claims the benefit of U.S. Provisional Application No. 62/822,316, filed on Mar. 22, 2019. The entire disclosure of the above application is incorporated herein by reference.

FIELD

The present disclosure relates to an HVAC door assembly, and, more specifically, to a linkage mechanism for a rotating HVAC doors along non-parallel axes in the HVAC door assembly.

BACKGROUND

This section provides background information related to the present disclosure which is not necessarily prior art.

Conventional heating, ventilation, and air conditioning (HVAC) designs use actuator(s) to drive one or multiple doors to control airflow through designated air pass. Existing designs require actuators mounted parallel to a door rotating axis. Therefore, for an HVAC system having doors rotating along nonparallel axes, multiple actuators are required to actuate the movement (one actuator for one set of doors moving along the same axis). Existing kinematic designs involve low cost competitiveness and high packaging space occupancy due to the increasing amount of actuators.

SUMMARY

This section provides a general summary of the disclosure, and is not a comprehensive disclosure of its full scope or all of its features.

At least one example embodiment of a heating, ventilation, and air conditioning (HVAC) door assembly according to the present disclosure includes a first HVAC door rotating about a first axis, a second HVAC door rotating about a second axis that is nonparallel with the first axis, an actuator, and a mode cam. The mode cam is engaged with the actuator and controls movement of the first HVAC door and the second HVAC door.

In at least one example embodiment, a first linkage assembly may connect the mode cam with the first HVAC door. A second linkage assembly may connect the mode cam with the second HVAC door.

In at least one example embodiment, the first linkage assembly may include a mid-link and a link. The mid-link may include a protrusion that engages with at least one groove on a surface of the mode cam to transfer movement from the mode cam. The link may engage with the mid-link to transfer movement from the mid-link to the first door.

In at least one example embodiment, the second linkage assembly may include a mid-link, a rack link, and a link. The mid-link may include a protrusion that engages with at least one groove on a surface of the mode cam to transfer movement from the mode cam. The rack link may engage with the mode cam to translate rotational movement into linear movement. The link may engage with the rack link to translate linear movement into rotational movement for the second door.

In at least one example embodiment, the mid-link may include a gear having a plurality of teeth that mesh with a plurality of teeth on the rack link.

In at least one example embodiment, the gear may be a spur gear.

In at least one example embodiment, the mid-link may move linearly along a first end of the rack link. The gear may turn to move the plurality of teeth along the plurality of teeth on the rack link.

In at least one example embodiment, the rack link may include a pin on an end of the rack link that is received within a slot defined by the link. The pin may slide within the slot to transfer movement of the rack link to the link.

In at least one example embodiment, the first linkage assembly may transfer rotational movement about the first axis from the mode cam to the first door.

In at least one example embodiment, the second linkage assembly may translate rotational movement about the first axis from the mode cam to rotational movement about the second axis to the second door.

In at least one example embodiment, the second linkage assembly may translate rotational movement about the first axis into linear movement along a third axis and may translate linear movement along the third axis into rotational movement about the second axis.

At least one example embodiment of a heating, ventilation, and air conditioning (HVAC) door actuation assembly according to the present disclosure may control movement of a first HVAC door rotating about a first axis and a second HVAC door rotating about a second axis that is nonparallel with the first axis. The door actuation assembly includes an actuator and a mode cam. The mode cam may be engaged with the actuator and may control movement of the first HVAC door and the second HVAC door.

In at least one example embodiment, a first linkage assembly may be configured to connect the mode cam with the first HVAC door. A second linkage assembly may be configured to connect the mode cam with the second HVAC door.

In at least one example embodiment, the first linkage assembly may include a mid-link and a link. The mid-link may include a protrusion that engages with at least one groove on a surface of the mode cam to transfer movement from the mode cam. The link may engage with the mid-link to transfer movement from the mid-link to the first door.

In at least one example embodiment, the second linkage assembly may include a mid-link, a rack link, and a link. The mid-link may include a protrusion that engages with at least one groove on a surface of the mode cam to transfer movement from the mode cam. The rack link may engage with the mode cam to translate rotational movement into linear movement. The link may engage with the rack link to translate linear movement into rotational movement for the second door.

In at least one example embodiment, the mid-link may include a gear having a plurality of teeth that mesh with a plurality of teeth on the rack link.

In at least one example embodiment, the mid-link may move linearly along a first end of the rack link. The gear may turn to move the plurality of teeth along the plurality of teeth on the rack link.

In at least one example embodiment, the rack link may include a pin on an end of the rack link that is received within a slot defined by the link. The pin may slide within the slot to transfer movement of the rack link to the link.

In at least one example embodiment, the first linkage assembly may transfer rotational movement about the first axis from the mode cam to the first door.

In at least one example embodiment, the second linkage assembly may translate rotational movement about the first axis into linear movement along a third axis and may translate linear movement along the third axis into rotational movement about the second axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
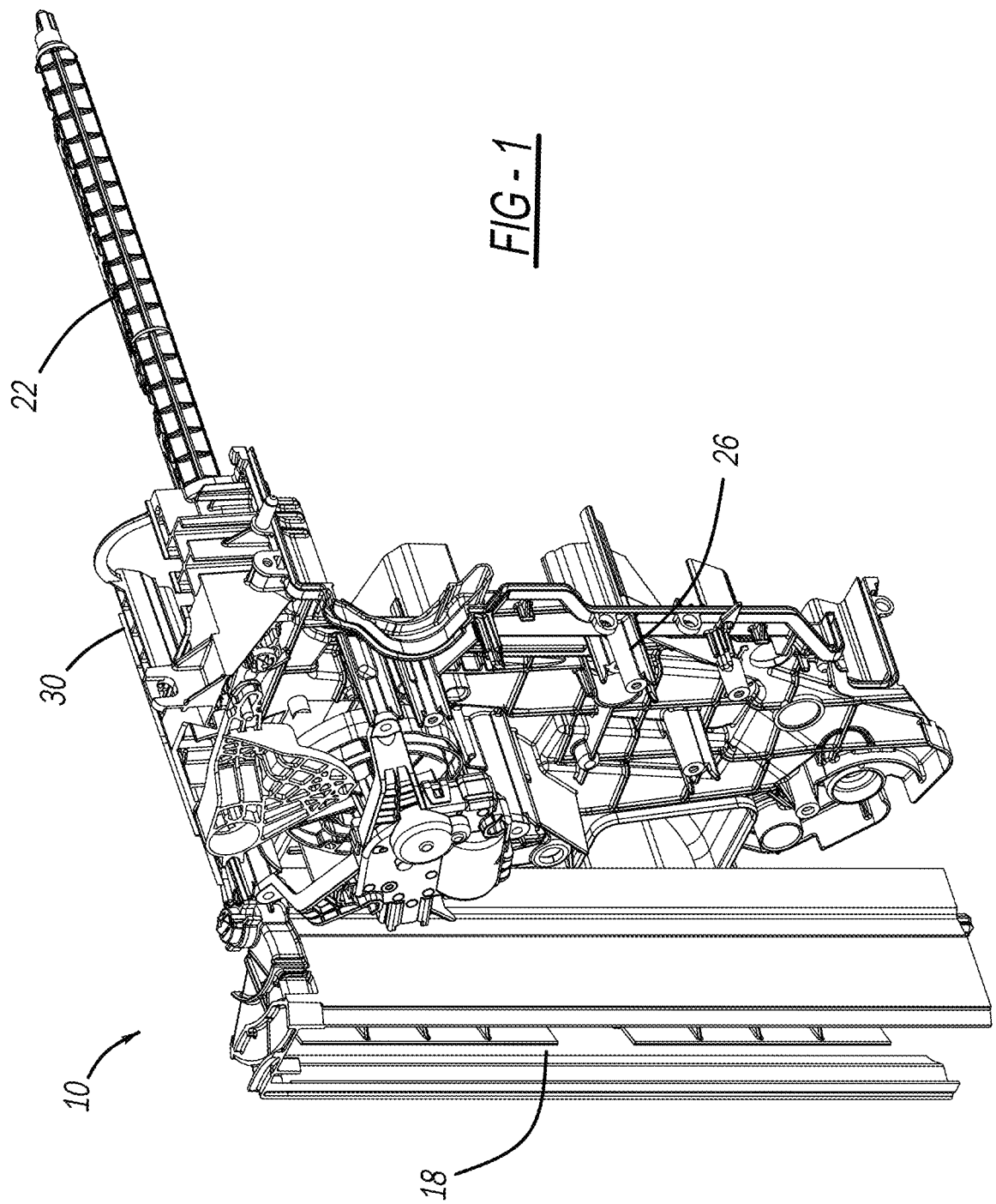
FIG. 1 is a perspective view of an example embodiment of a heating, ventilation, and air conditioning (HVAC) assembly including a linkage assembly according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A linkage mechanism to drive doors rotating along nonparallel axes according to the present disclosure includes a linkage mechanism which enables one actuator to drive multiple doors rotating along nonparallel axes. The design of the present disclosure results in cost savings and packaging space savings by reducing an amount of actuator usage.

For example, the linkage mechanism may include a single actuator that drives two doors. The first door may rotate along a first axis, such as the Y-axis, and a second door may rotate along a second axis, such as the Z-axis. A set of linkages and a mode cam may cooperate to transfer torques and movements from the single actuator to the first door and second door. An output shaft out of the actuator may directly drive the mode cam, which has multiple grooves determining a mode pattern for one of the first door and the second door.

For the first door moving along the first axis, different door angles for different modes may be achieved through a motion transfer path such as: actuator, mode cam groove A, mid-link A, link A, door A. For the second door moving along the second axis, different door angles for different modes may be achieved through a motion transfer path such as: actuator, mode cam groove B, mid-link B, rack link, link B, door B. In the examples with door A and door B, the rotation axis of door A and the rotation axis of the actuator may be in parallel while the rotation axis of the actuator and the rotation axis of the door B may be an axis that is non-parallel (for example, an axis intersecting or perpendicular) to the rotation axis of door A. The motion direction change for door B may occur through the rack link. A gear-rack meshing mechanism and a pin-groove driving mechanism enables the change in motion direction. The gear-rack meshing includes a rack link that meshes with a spur gear of the mid-link B. The pin-groove driving involves a pin portion of the rack link engaging with the groove on link B. The link B then drives the door to be rotated along the second axis.

Now referring to FIG. 1, a door linkage assembly 10 according to the present disclosure is illustrated. The door linkage assembly 10 may transfer movement from an actuator 14 to a first door 18 and a second door 22. A first case 26 may house the first door 18 which moves along a first axis, and a second case 30 may house the second door 22 which moves along a second axis.

In at least one example embodiment, the first door 18 may pivot about the first axis from an open position to a closed position and various angles therebetween. For example only, the closed position may be an angle of 0° and the open position may be an angle of 90°. Different door angles may be achieved for different movement modes controlled by the actuator 14 and door linkage assembly 10.

In at least one example embodiment, the second door 22 may pivot about the second axis from an open position to a closed position and various angles therebetween. For example only, the closed position may be an angle of 0° and the open position may be an angle of 90°. Different door angles may be achieved for different movement modes controlled by the actuator 14 and door linkage assembly 10.

In at least one example embodiment, the first axis and the second axis may be non-parallel axes. More specifically, the first axis and the second axis may be perpendicular axes. For example only, the first axis may be a y-axis and the second axis may be a z-axis. Further, it is understood that the first axis and the second axis may be any axes, including parallel axes, perpendicular axes, or axes separated by any angle.

Figure 2:
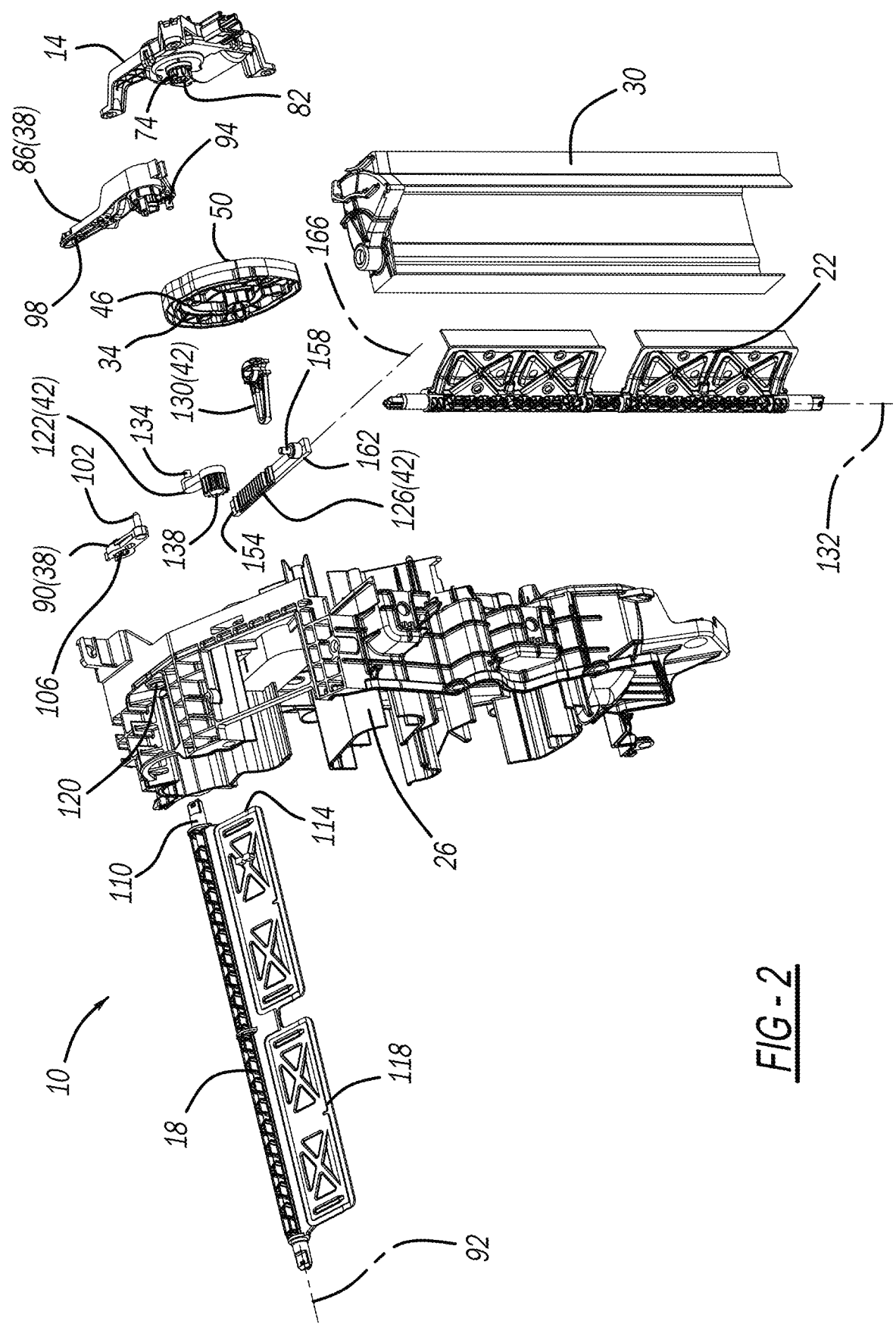
FIG. 2 is an exploded view of the HVAC assembly of FIG. 1.

Referring additionally to FIG. 2, the door linkage assembly 10 may include a mode cam 34, a first linkage assembly 38 that cooperates with the mode cam 34 and actuator 14 for controlling movement of the first door 18, and a second linkage assembly 42 that cooperates with the mode cam 34 and actuator 14 for controlling movement of the second door 22.

In at least one example embodiment, the mode cam 34 may be a substantially planar cam having a first surface, or front surface, 46 and a second surface, or rear surface, 50 opposite the front surface 46. At least one groove 54 may be cut on one or both of the front surface 46 and the rear surface 50. In at least one example embodiment, a first groove 54A may be cut on the front surface 46 of the mode cam 34 for controlling a movement mode of the first door 18 and a second groove 54B may be cut on the front surface 46 of the mode cam 34 for controlling a movement mode of the second door 22. In at least one alternative example embodiment, a first groove 54A may be cut on the front surface 46 of the mode cam 34 for controlling a movement mode of the first door 18 and a second groove 54B may be cut on the rear surface 50 of the mode cam 34 for controlling a movement mode of the second door 22.

The shape of the groove 54 may determine a path of the door (for example, an angle of the door). In at least one example embodiment, the groove 54 may have spiraling segments and circular segments. For example, the groove 54A includes one end 58A nearer to a center 62 of the mode cam 34 and a second end 58B further from the center 62. The groove 54B includes one end 66A nearer to the center 62 of the mode cam 34 and a second end 66B further from the center 62.

In at least one example embodiment, circular segments and spiraling segments may be arranged in alternating order for groove 54A (i.e., one spiraling segment may connect to two circular segments at opposing ends of the spiraling segment). The ending segments of groove 54A may be circular segments.

In at least one example embodiment, circular segments and spiraling segments may be arranged in alternating order for groove 54B (i.e., one spiraling segment may connect to two circular segments at opposing ends of the spiraling segment). The ending segments of groove 54B may be circular segments. In at least one example embodiment, groove 54B may be located outside of groove 54A (i.e., the circular segment of 54B with the smallest radius may be larger than the circular segment of 54A with the largest radius).

In at least one example embodiment, the spiraling segment may be a transition between two adjacent modes (i.e., move the door from one mode position to another mode position with a certain angle). In at least one example embodiment, the circular segment may be an idle zone for a designated mode (i.e., may maintain the door at a designated mode position for a period of time regardless of the rotation of the mode cam 34).

The mode cam 34 may be driveably engaged with the actuator 14. For example, an output shaft 74 out of the actuator 14 may be fixed or locked within one or more central apertures (for example only, a t-cut male end) 78 for selectively rotating the mode cam 34. In at least one example embodiment, the output shaft 74 may include one or more prongs 82 (for example only, a t-cut female end 82) that engage with the central apertures 78 to fix the mode cam 34 for rotation with the output shaft 74.

In at least one example embodiment, the first linkage assembly 38 may include at least one mid-link 86 and at least one link 90. The mid-link 86 may be engaged with the groove 54 (for example only, groove 54C) on the mode cam 34 (for example, the rear surface 50 of the mode cam 34) for directing the movement of the first door 18. In at least one example embodiment, the movement from the mode cam 34 may be movement about a first axis (for example, the Y-axis) 92. The link 90 may be engaged with the mid-link 86 and the door 18 for transferring the movement from the mid-link 86 to the first door 18. In at least one example embodiment, the movement of the first door 18 may be movement about the first axis (for example, the Y-axis).

In at least one example embodiment, the mid-link 86 may include at least one projection 94 and at least one groove 98. The at least one projection 94 may be configured to engage the groove 54 (for example only, the groove 54C) in the mode cam 34. For example, the projection 94 may be a cylindrical projection configured to ride in, and follow, the path of the groove 54 in the mode cam 34. In at least one example embodiment, the at least one projection 94 may be a pin or other cylindrical projection or rod on the mid-link 86 that may engage with the groove 54 (for example, groove 54C) on the rear surface 50 of the mode cam 34.

In at least one example embodiment, the groove 98 may be configured to receive one projection 102 of the link 90 (for example, attaching or fixing the link thereto). For example, the portion of the link 90 protrudes through the groove 98 and is slideable therein, such that the link 90 may pivot relative to the mid-link 86. In at least one example embodiment, the link 90 may be positioned on a same side of the mid-link 86 as the mode cam 34.

The link 90 may include at least one projection 102 and at least one aperture 106. The at least one projection 102 may be engaged with the groove 98 in the mid-link 86. For example only, the at least one projection 102 may be a pin or other cylindrical projection or rod that engages the groove in the mid-link 86.

The at least one aperture 106 may configured to receive a portion of the first door 18, fixing the door 18 thereto. For example, the portion of the first door 18 may be immovably fixed within the aperture 106 such that the door 18 moves with, and is fixed relative to, the link 90. In at least one example embodiment, the first door 18 may be fixed to an opposing side of the link 90 and rotates along with link 90.

In at least one example embodiment, the first door 18 may include a projection 110 extending along the pivoting axis of the first door 18 and from an end 114 of a body 118 of the first door 18. The projection 110 may be integral with the body 118 of the first door 18. In at least one example embodiment, the projection 110 may have a T-shaped cross-sectional male end that mates with a T-shaped aperture 106 (or female end) in the link 90, such that the projection 110 cannot pivot or rotate within the aperture 106 and relative to the link 90. As such, when the link 90 rotates or turns, the first door 18, through the projection 110, also pivots, rotates, or turns with the link 90.

In at least one example embodiment, the projection 110 of the first door 18 may extend through an aperture 120 in the first case 26 before engaging with the aperture 106 in the link 90. The projection 110 may be pivotably engaged with the aperture 120 in the first case 26 such that the projection 110, the first door 18, and the link 90 may pivot or rotate relative to the first case 26.

In other words, in at least one example embodiment, movement of the first door 18 may be achieved through a torque and motion transfer path from the actuator to the first door 18 as follows: (1) actuator 14; (2) mode cam 34; (3) mid-link 86; (4) link 90; (5) door 18.

In at least one example embodiment, the second linkage assembly 42 may include at least one mid-link 122, at least one rack link 126, and at least one link 130. The mid-link 122 may be engaged with the groove 54 (for example, groove 54A) on the mode cam 34 for directing the movement of the second door 22. In at least one example embodiment, the movement from the mode cam 34 may be about a first axis (for example, the Y-axis). The rack link 126 may be engaged with the mid-link 122 to translate the rotational movement along the first axis (for example, the Y-axis) to linear movement along any axes in XZ-plane (for example, the X-axis) 166. The link 130 may be engaged with the rack link 126 and the second door 22 for transferring the linear movement along any axes on XZ-plane from the rack link 126 to a rotational movement along any axes in the YZ-plane (for example, the Z-axis) of a second door 22. In at least one example embodiment, the movement of the second door 22 may be rotational movement about the second axis (for example, the Z-axis) that is non-parallel to the first axis (for example, the Y-axis).

In at least one example embodiment, the mid-link 122 may include at least one projection 134 and at least one spur gear, or toothed wheel, 138. The at least one projection 134 may be configured to engage the groove 54 (for example only, the groove 54A) in the mode cam 34. For example, the projection 134 may be a cylindrical projection configured to ride in, and follow, the path of the groove 54 in the mode cam 34. While only one projection 134 is illustrated, it is understood that multiple projections 134 may be included on the mid-link 122 for engaging with the mode cam 34. In at least one example embodiment, the at least one projection 134 on the mid-link 122 may engage with the groove 54 (for example, the groove 54A) on the front surface 46 of the mode cam 34.

In at least one example embodiment, the spur gear 138 may be a toothed wheel having a plurality of teeth 142 configured to engage with mating teeth 146 on the rack link 126. For example, the spur gear 138 may rotate to "roll" along the rack link 126, with the teeth 142 of the spur gear 138 intertwining or meshing with the teeth 146 on the rack link 126.

In at least one example embodiment, the rack link 126 may be an elongated plate having a rectangular shape with rounded corners. The plurality of teeth 146 may be disposed on a top planar surface 150 of the rack link 126 on a first end 154 of the rack link 126. The rack link 126 may include a pin 158 or cylindrical rod protruding therefrom. For example, the pin 158 may be disposed on an end 162 of the rack link 126 opposite the end 154 of the rack link 126 having the plurality of teeth 146. The pin 158 may project to any perpendicular directions to the linear movement of the plurality of teeth 146 on rack link 126. In at least one example embodiment, the pin 158 may project to Z-axis while to the movement of the plurality of teeth 146 on rack link 126 may be a linear movement along X-axis.

In at least one example embodiment, the rack link 126 may translate the motion of the mid-link 122 from rotational movement about the first axis 92 to movement about the second axis 132. The movement of the spur gear 138 along the rack link 126 transfers the first axis rotation of mid-link 122 into a third axis (for example, the X-axis) 166 linear movement of rack link 126. The pin 158 may engage with the link 130 to transfer the third axis 166 linear movement of the rack link 126 into rotational movement about the second axis 132 at link 130.

In at least one example embodiment, the rack link 126 may be fixed to an opposing side of the mid-link 122 from the mode cam 34.

In at least one example embodiment, the link 130 may include at least one slot or channel 170 and at least one aperture 174. The slot 170 may be configured as a groove to receive the pin 158 of the rack link 126. For example, the pin 158 of the rack link 126 may protrude through the slot 170 and be slideable therein to translate the third axis 166 linear movement of the rack link 126 into rotational movement about the second axis 132 at link 130.

In at least one example embodiment, the link 130 may be engaged with any side of the rack link 126 depending on the projecting direction of pin 158 at an end 162 of rack link 126. For example, the link 130 may be engaged with the same side of the rack link 126 as mid link 122.

The at least one aperture 174 may configured as T-shape female end to receive a projection 178 of the second door 22, fixing the second door 22 thereto. For example, the portion of the second door 22 may be immovably fixed within the aperture 174 such that the second door 22 moves with, and is fixed relative to, the link 130. In at least one example embodiment, the second door 22 may be fixed to a same side of the link 130 as the rack link 126.

In at least one example embodiment, the second door 22 may include a projection 178 extending along the pivoting axis 132 (i.e., the second axis 132) of the second door 22 and from an end 182 of a body 186 of the second door 22. The projection 178 may be integral with the body 186 of the second door 22. In at least one example embodiment, the projection 178 may have T-shaped cross-sectional male end that mates with an T-shaped aperture 174 (or female end) in the link 130, such that the projection 178 cannot pivot or rotate within the aperture 174 and relative to the link 130. As such, when the link 130 rotates or turns, the second door 22, through the projection 178, also pivots, rotates, or turns with the link 130.

In other words, in at least one example embodiment, movement of the second door 22 may be achieved through a torque and motion transfer path from the actuator to the second door 22 as follows: (1) actuator 14; (2) mode cam 34; (3) mid-link 122; (4) rack link 126; (5) link 130; (6) door 22.

Figure 3A:
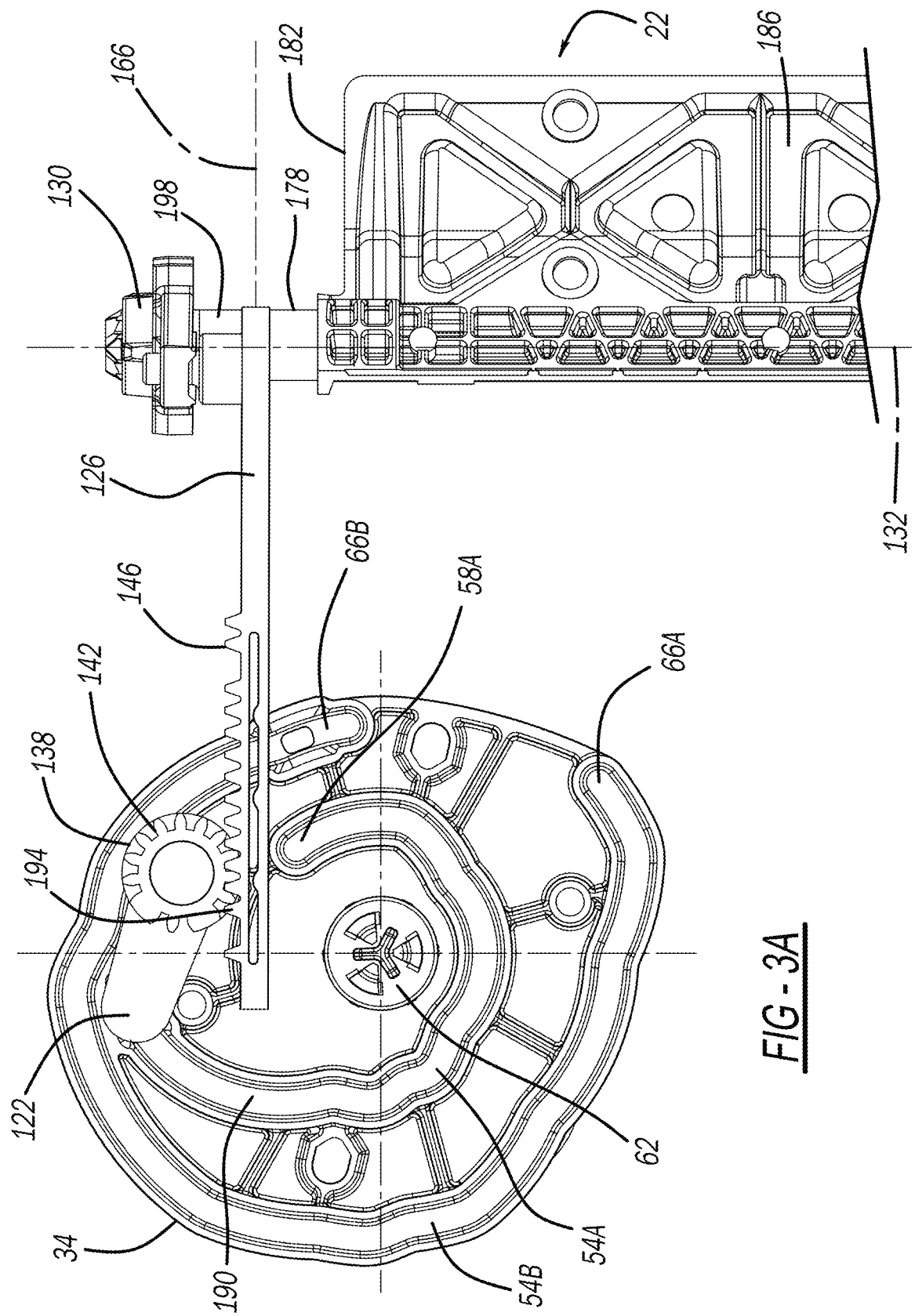
FIG. 3A is a front view of a single linkage assembly, actuator, and mode cam of the HVAC assembly of FIG. 1 in a first mode.
Figure 3B:
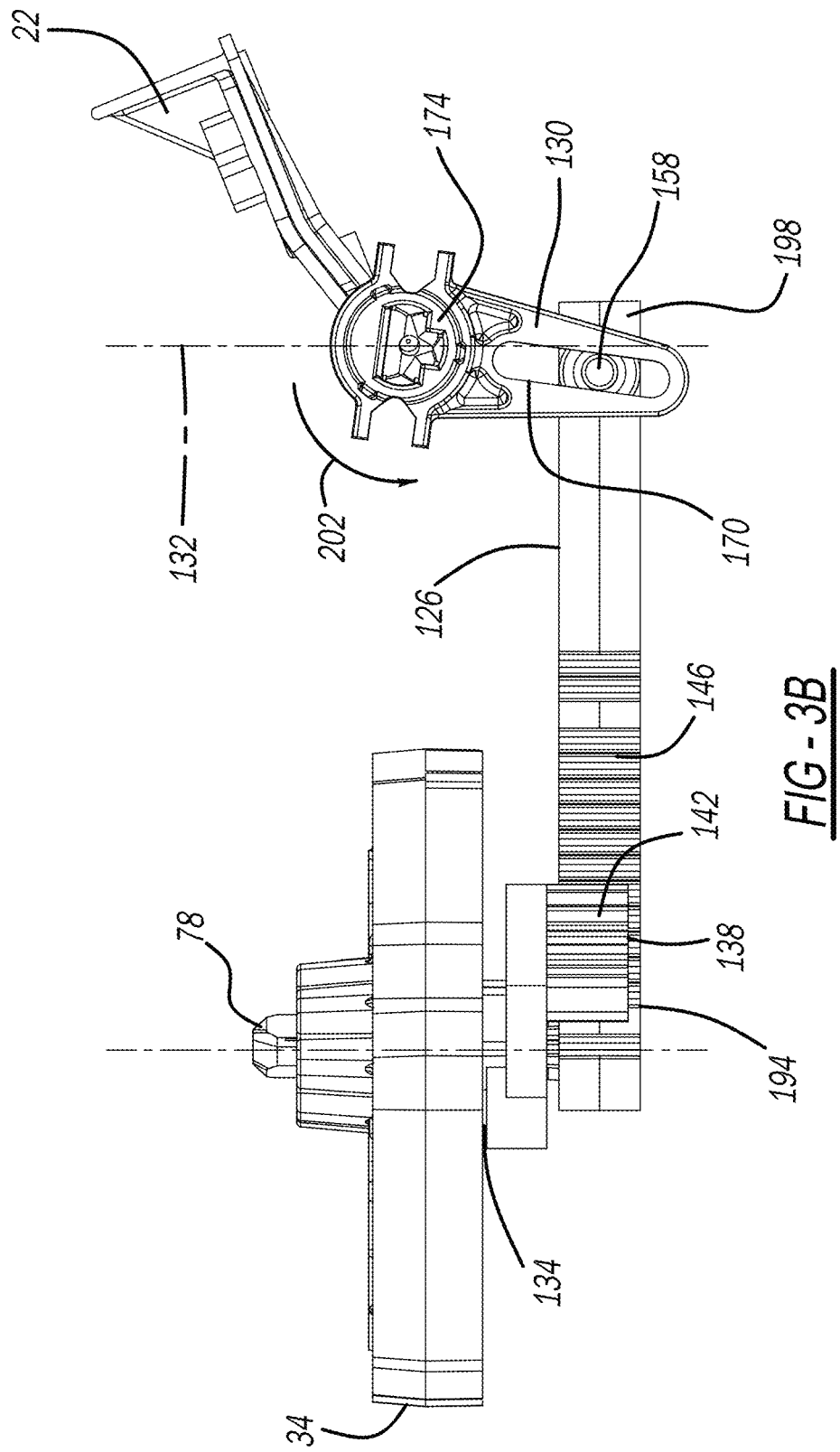
FIG. 3B is a top view of the single linkage assembly, actuator, and mode cam of the HVAC assembly of FIG. 3A in the first mode.

Now referring to FIGS. 3A and 3B, a first example mode pattern for an HVAC door of the present disclosure is illustrated. For example only, the first example mode pattern is illustrated for the second door 22, although the first example mode pattern is applicable for either the first door 18 or the second door 22.

As shown in FIG. 3A, the projection 134 of the mid-link 122 may travel within the groove 54A on the surface 46, 50 of the mode cam 34. As the mode cam 34 is rotated by the actuator 14, the travel of the projection 134 in the groove 54A forces the gear 138 of the mid-link 122 to rotate along an axis parallel to the rotating axis of mode cam 34. The teeth 142 of gear 138 on the mid-link 122 mesh with the teeth 146 on the rack link 126 to pull and push the rack link along an axis through the rack link and to transfer the rotational movement of mid link 122 to a linear movement of rack link 126.

Linear movement of the rack link 126 caused by the meshing of teeth 142 on gear 138 with teeth 146 on rack link 126 drives movement of the pin 158 on rack link 126 within slot 170. Movement of the pin 158 in slot 170 on link 130 forces rotational movement of the link 130 and thus the projection 178 fixed to the second door 22, causing the second door 22 to rotate or pivot.

As shown in FIGS. 3A and 3B, when mode cam 34 is at a position 190, pin 134 of mid link 122 is located at a first circular segment of groove 54A starting from end 58B to move mid link 122 to a position 194 for a first mode. Gear teeth 142 of mid link 122 mesh with rack teeth 146 of rack link 126 to enable pin 158 of rack link 126 to move to a position 198 for the first mode. Pin 158 of rack link 126 is engaged with groove 170 of link 130 to move aperture 174 to a position 202 for the first mode. Aperture 174 of link 130 may be engaged with door mating projection 178 of door 22 to move door 22 to the first mode position.

As shown in FIG. 3B, in at least one example embodiment, the mid-link 122 may be positioned on the front surface 46 of the mode cam 34 while the actuator 14 may be positioned on the rear surface 50 of the mode cam 34. The mid-link 122 may be positioned on a first end 154 of the rack link 126 while the link 130 may be engaged with the pin 158 on a second end 162 spaced from the end 154. The pin 158 on the rack link 126 may be engaged with the slot 170 on an end of the link 130 spaced from the aperture 174 receiving the projection 178 on the second door 22.

Figure 4A:
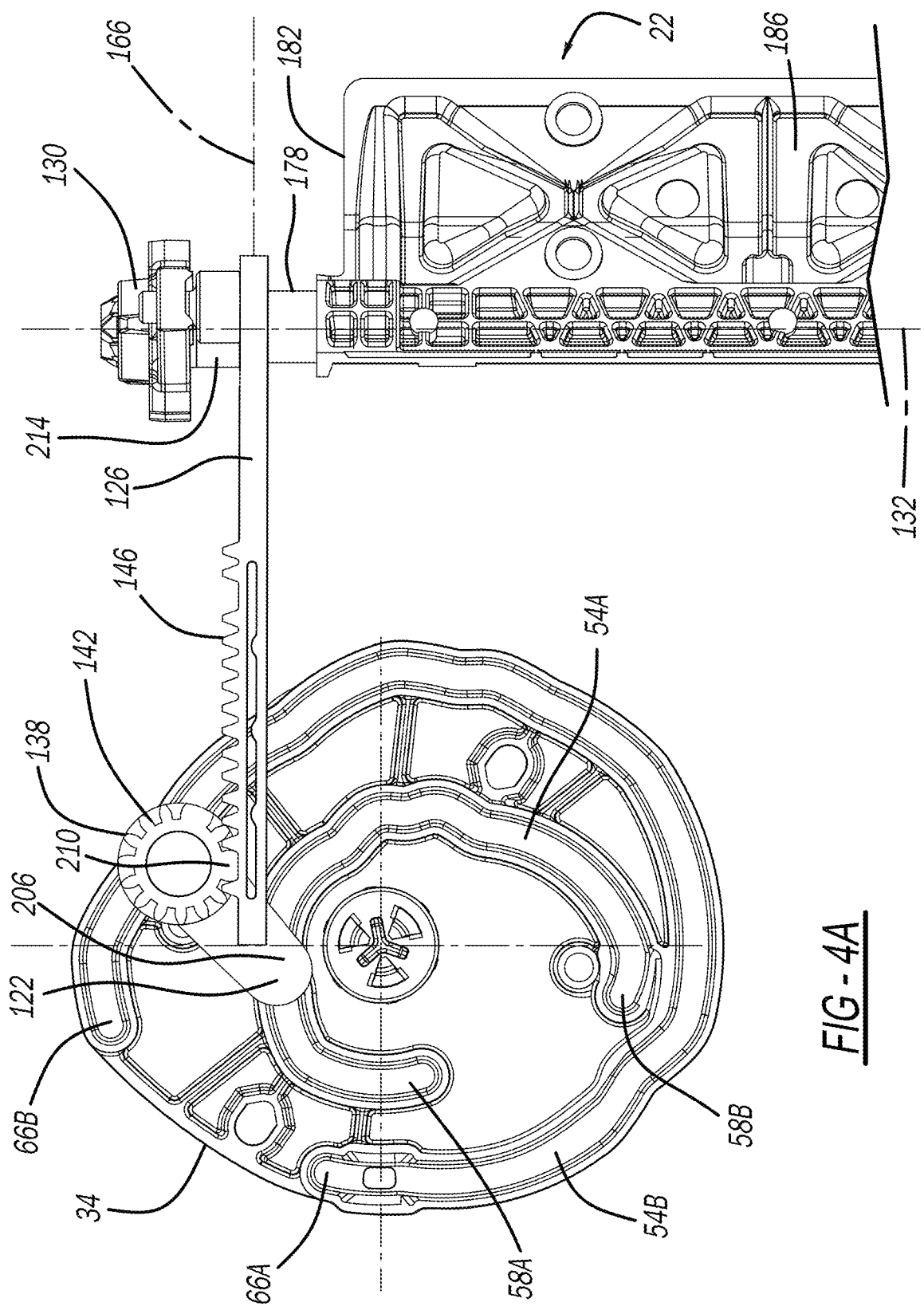
FIG. 4A is a front view of a single linkage assembly, actuator, and mode cam of the HVAC assembly of FIG. 1 in a second mode.
Figure 4B:
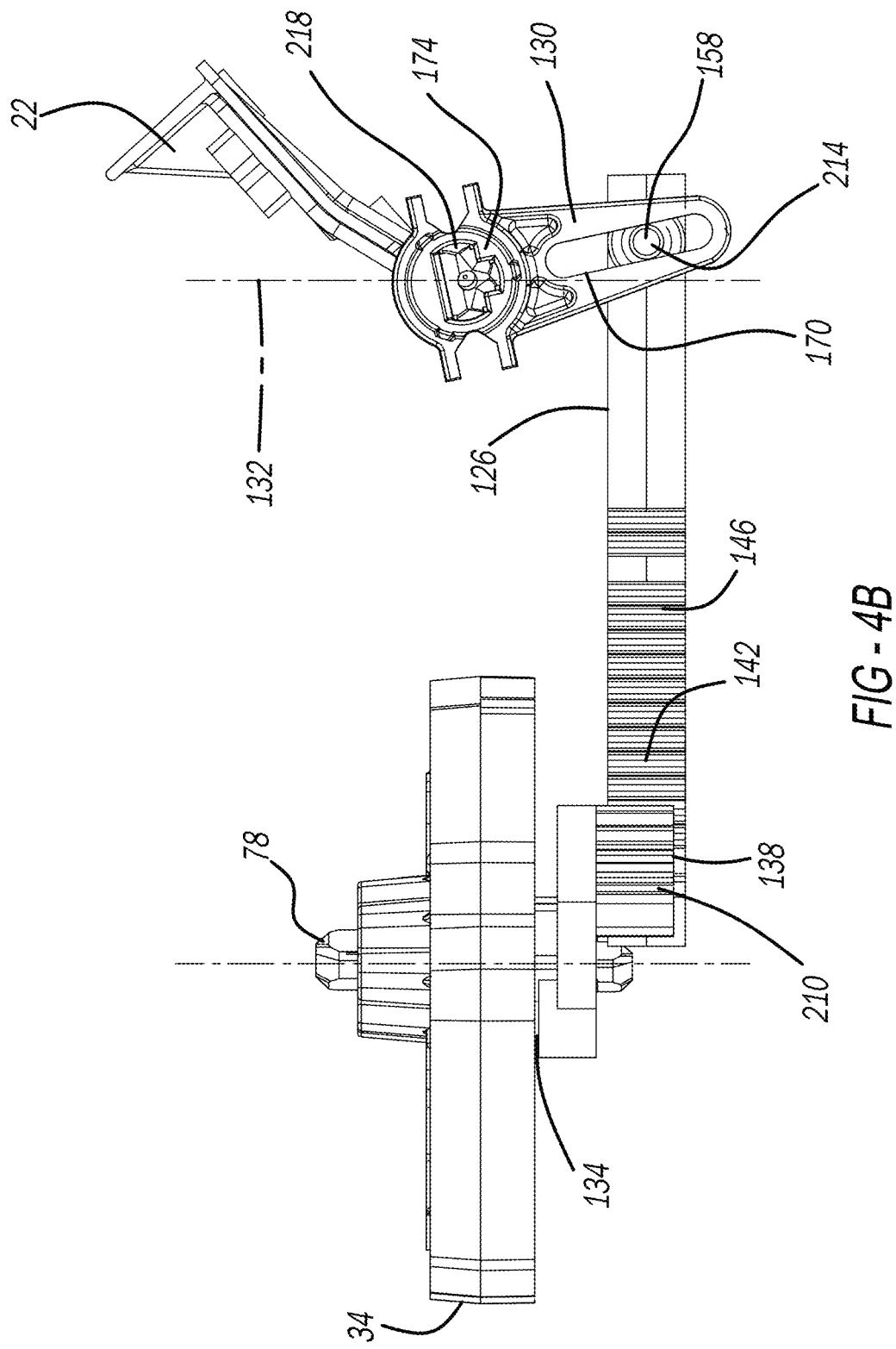
FIG. 4B is a top view of the single linkage assembly, actuator, and mode cam of the HVAC assembly of FIG. 4A in the second mode.

Now referring to FIGS. 4A and 4B, a second example mode pattern for an HVAC door of the present disclosure is illustrated. For example only, the second example mode pattern is illustrated for the second door 22, although the second example mode pattern is applicable for either the first door 18 or the second door 22.

As shown in FIG. 4A, the projection 134 of the mid-link 122 may travel within the groove 54A on the surface 46, 50 of the mode cam 34. As the mode cam 34 is rotated by the actuator 14, the travel of the projection 134 in the groove 54A forces the gear 139 of the mid-link 122 to rotate along an axis parallel to the rotating axis of mode cam 34. The teeth 142 of gear 138 on the mid-link 122 mesh with the teeth 146 on the rack link 126 to pull and push the rack link along an axis through the rack link and to transfer the rotational movement of mid link 122 to a linear movement of rack link 126.

Linear movement of the rack link 126 caused by the teeth 142 on gear 138 meshing with teeth 146 on rack link 126 drives movement of the pin 158 on rack link 126 within slot 170. Movement of the pin 158 in slot 170 on link 130 forces rotation movement of the link 130 and thus the projection 178 fixed to the second door 22, causing the second door 22 to rotate or pivot.

As shown in FIGS. 4A and 4B, when mode cam 34 is at position 206, pin 134 of mid link 122 may be located at the third circular segment of groove 54A starting from end 58B to move mid link 122 to a position 210 for the second mode. Gear teeth 142 of mid link 122 mesh with rack teeth 146 of rack link 126 to move pin 158 of rack link 126 to a position 214 for the second mode. Pin 158 of rack link 126 is engaged with groove 170 of link 130 to move aperture 174 to a position 218 for the second mode. Aperture 174 of link 130 may be engaged with door mating projection 178 of door 22 to move the door 22 to the second mode position.

As shown in FIG. 4B, in at least one example embodiment, the mid-link 122 may be positioned on the front surface 46 of the mode cam 34 while the actuator 14 may be positioned on the rear surface 50 of the mode cam 34. The mid-link 122 may be positioned on one end 154 of the rack link 126 while the link 130 may be engaged with the pin 158 on the opposite end 162 from the end 154. The mid-link 122 may be positioned on a first end 154 of the rack link 126 while the link 130 may be engaged with the pin 158 on a second end 162 spaced from the first end 154. The pin 158 on the rack link 126 may be engaged with the slot 170 on one end of the link 130 spaced from the aperture 174 receiving the projection 178 on the second door 22.

While the above two movement modes are illustrated, it is understood that different configurations of the grooves on the surface 46, 50 of the mode cam 34 will generate different movement modes of the doors 18, 22. It is further understood that while movement control of two doors 18, 22 is discussed herein, additional linkage assemblies could be added to the mode cam 34 and actuator 14 to control additional doors.

The ability to add multiple linkage assemblies to a common mode cam 34 and actuator 14 provides a reduction in parts for HVAC door assemblies. The reduction in parts reduces cost of the assemblies, both in part cost and assembly cost. The reduction in parts also reduces the space occupied for the HVAC door assemblies, allowing the HVAC units and assemblies to fit in smaller places.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation, and air conditioning (HVAC) door assembly comprising:
    a first HVAC door rotating about a first axis;
    a second HVAC door rotating about a second axis, the second axis being nonparallel with the first axis;
    an actuator;
    a mode cam engaged with the actuator and controlling movement of the first HVAC door and the second HVAC door;
    a first linkage assembly connecting the mode cam with the first HVAC door; and
    a second linkage assembly connecting the mode cam with the second HVAC door;
    wherein the second linkage assembly includes a mid-link, a rack link, and a link, the mid-link includes a protrusion that engages with at least one groove on a surface of the mode cam to transfer movement from the mode cam, the rack link engages with the mode cam to translate rotational movement into linear movement, and the link engages with the rack link to translate linear movement into rotational movement for the second door; and
    wherein the mid-link includes a gear having a plurality of teeth that mesh with a plurality of teeth on the rack link.

2. The HVAC door assembly of claim 1, wherein the gear is a spur gear.

3. The HVAC door assembly of claim 1, wherein the mid-link moves linearly along a first end of the rack link, the gear turning to move the plurality of teeth along the plurality of teeth on the rack link.

4. The HVAC door assembly of claim 1, wherein the rack link includes a pin on an end of the rack link that is received within a slot defined by the link, and the pin slides within the slot to transfer movement of the rack link to the link.

5. The HVAC door assembly of claim 1, wherein the second linkage assembly translates rotational movement about the first axis from the mode cam to rotational movement about the second axis to the second door.

6. The HVAC door assembly of claim 5, wherein the second linkage assembly translates rotational movement about the first axis into linear movement along a third axis and translates linear movement along the third axis into rotational movement about the second axis.

7. A heating, ventilation, and air conditioning (HVAC) door actuation assembly for controlling movement of a first HVAC door rotating about a first axis and a second HVAC door rotating about a second axis, the second axis being nonparallel with the first axis, the door actuation assembly comprising:
    an actuator;
    a mode cam engaged with the actuator and controlling movement of the first HVAC door and the second HVAC door;
    a first linkage assembly configured to connect the mode cam with the first HVAC door; and
    a second linkage assembly configured to connect the mode cam with the second HVAC door;
    wherein the second linkage assembly includes a mid-link, a rack link, and a link, the mid-link includes a protrusion that engages with at least one groove on a surface of the mode cam to transfer movement from the mode cam, the rack link engages with the mode cam to translate rotational movement into linear movement, and the link engages with the rack link to translate linear movement into rotational movement for the second door; and
    wherein the mid-link includes a gear having a plurality of teeth that mesh with a plurality of teeth on the rack link.

8. The HVAC door assembly of claim 7, wherein the mid-link moves linearly along a first end of the rack link, the gear turning to move the plurality of teeth along the plurality of teeth on the rack link.

9. The HVAC door assembly of claim 7, wherein the rack link includes a pin on an end of the rack link that is received within a slot defined by the link, and the pin slides within the slot to transfer movement of the rack link to the link.

10. The HVAC door assembly of claim 7, wherein the second linkage assembly translates rotational movement about the first axis into linear movement along a third axis and translates linear movement along the third axis into rotational movement about the second axis.

* * * * *